July 9, 1929.　　　W. NOWAK　　　1,720,188
BRAKE SHOE OPERATING DEVICE
Filed Nov. 30, 1926
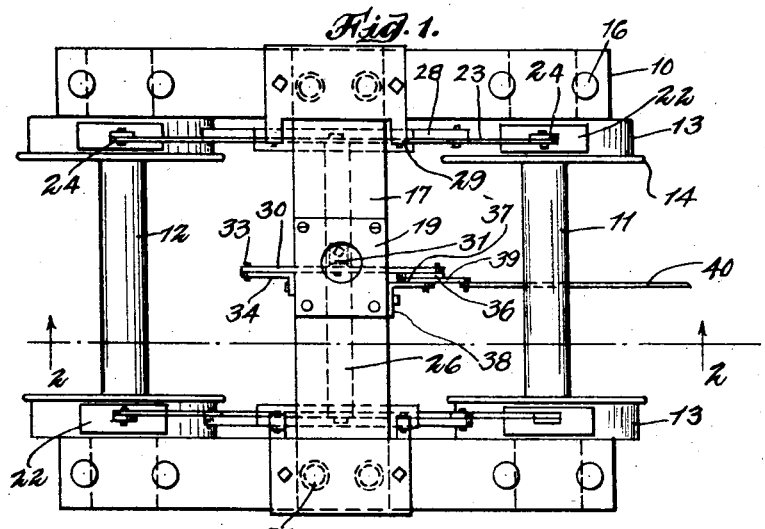
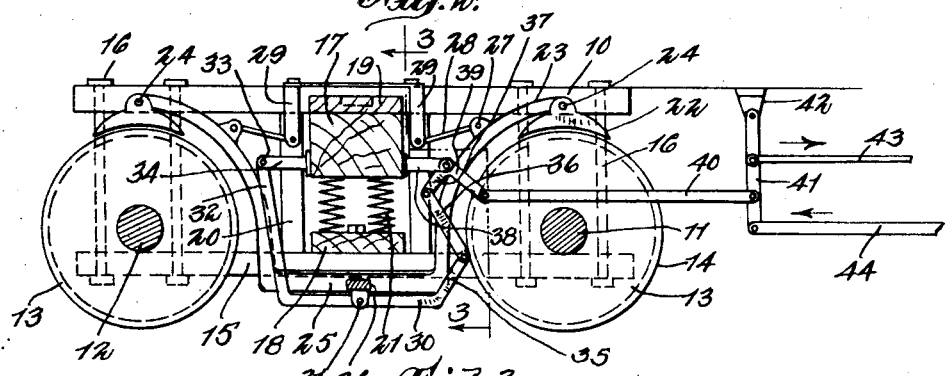
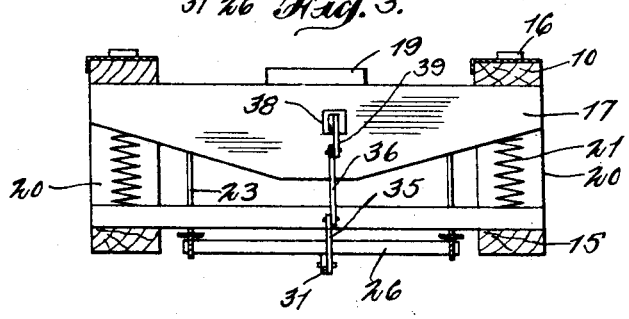
Inventor
William Nowak Patented July 9, 1929.

1,720,188

UNITED STATES PATENT OFFICE.

WILLIAM NOWAK, OF AKRON, OHIO.

BRAKE-SHOE-OPERATING DEVICE.

Application filed November 30, 1926. Serial No. 151,687.

This invention relates to improvements in braking devices, particularly to an auxiliary braking device to be used in conjunction with the air-brakes of a railroad train, and it is the principal object of the invention to provide such a braking device for the wheels of the trucks of railroad cars in which all the wheels of the truck are braked simultaneously upon the operation of the main brake lever on the train.

Another object of the invention is the provision of a braking device for the wheels of the trucks of railroad cars or the like in which the brake shoes for the wheels are arranged upon the ends of the arms of a movable frame which are connected for common operation by means of the air-brake main lever.

A further object of the invention is the provision of a braking device for railroad cars or the like equipped with a movable frame, the arms of which are interconnected, and normally held in their inoperative position above the wheels by specially constructed arms or links.

These and other objects and advantages of the invention will become more fully known as the description thereof proceeds, and will then be specifically pointed out in the appended claims.

In the accompanying drawing forming a material part of this disclosure:

Fig. 1 is a top plan view of a truck for railroad cars equipped with a braking device constructed according to the present invention.

Fig. 2 is a side elevation thereof.

Fig. 3 is a section on line 3—3 of Figure 2.

As illustrated on the drawing: The truck of a railroad car consists of the customary frame 10 in which the wheel axles 11 and 12 are journaled in the customary manner, carrying the wheels 13 equipped with the customary rail engaging flanges 14. The upper truck frame bars 10, and the lower side bars 15 of the frame are connected by means of a plurality of parallel bolts 16, headed at their upper and lower ends, and the frame bars on opposite sides of the truck are connected by median upper beam 17, and a lower beam 18. The upper beam 17 carries in its center a swivel socket for the swivel bolt of the car, said socket being designated 19. Pairwise arranged posts 20 to both sides of the median beams connect and brace the upper and lower frame bars 10 and 15 of the truck, while strong spiral springs 21 between the beams 17 and 18 cushion both beams, the upper of which is not connected to the frame.

A separate brake shoe 22 is provided for each wheel acting preferably against the top part of the wheel, and each shoe sits at the end of a curved arm 23 to which it is pivoted at 24. The lower ends of each pair of arms 23 are connected by a straight bar or bars 25 or made integrally therewith, and the pair of bars 25, one on each side of the truck, are connected in approximately the middle by means of a cross-bar 26.

Near their upper ends the curved arms 23 carry eyes 27 to which are secured, pivotally the outer ends of links 28, the inner ends of which are pivotally attached to brackets 29 attached to the inner side faces of frame bars 10.

A rocking bar or frame 30 having upwardly directed inclined arms is loosely connected to approximately the middle of cross-bar 26, as at 31, and one of the arms of said frame 30, designated 32, is pivotally secured, as at 33, to a bracket 34 on the outer face of beam 17. An arm 35 is attached at one end to the frame bar 30, and to its other end a link 36 is pivotally attached, the upper end of which in turn is pivotally attached to the outer end of one arm 37 of a bell-crank lever fulcrumed to the front side bracket 38 on beam 17, while the other arm of the bell crank lever, designated 39 has pivotally attached thereto the inner end of an operating link 40, the opposite end of which is pivotally attached to a lever 41 pivotally attached at its upper end to an eye 42 secured to the bottom of the railroad car. Intermediate its ends the lever 41 has pivotally attached thereto a draw rod 43 adapted to be operated from the brake lever of the air-brake system adapted to operate the brake shoes while a rod 44 pivotally connected to the lower end of lever 41 is adapted to lift the shoes from the wheels after each braking operation.

In the operation of my device, when the brakes are applied, the cross bar 26 is drawn downwardly which will cause the outer ends of the links 28 to move accordingly, and in view of the fact that the inner ends of the links 28 are pivotally secured to the brackets 29, the outer ends of said links 28 will move in an arc, but as the arc is very slight and some lost motion is provided in the pivots of the links 28, the arms 23 will move and give to an extent sufficient to allow the shoes 22 to engage the wheels and set up a braking action. It will be apparent that only a slight movement of the arms 23 is necessary to cause the shoes 22 to engage the wheels, as the normal position of the shoes will be approximately an inch above the wheels.

The arms 23 will give as above set forth, due to the shape of the members that make up the members 23 and bars 30 and also the size of these members. The shape of these members as will be noted upon inspection of Figure 2, are substantially in the form of a U, and as the members are approximately five feet long, from the end of one arm to the end of the companion arm, it will be apparent that they will give to a considerable extent more especially in view of the inherent resiliency of the material from which the members will be made, and this last mentioned quality of the members, namely the inherent resiliency thereof will result in the members always assuming their natural shape, when the operation of the brakes is completed.

From the above description and disclosure in the drawings, it will be apparent that upon the operation of the air brake lever the draw rod 43 in the direction of the arrow, the shoes 22 will simultaneously engage the wheels, while upon the operation of rod 44 in the direction of its arrow the shoes will disengage simultaneously from the wheels.

It is to be understood that such changes may be made in the general arrangement of my device and the construction of its minor details as come within the scope of the appended claims without departing from the spirit of my invention as described and shown.

Having thus described my invention, what I claim as new and desire to secure by Letters Patent is:

1. In a braking device for the wheels of railroad car trucks a brake shoe for each truck wheel, curved arms connecting two shoes on each side of the truck, means for coupling the arms, links pivotally secured at one end to the upper edges of said arms near their upper ends and pivotally secured at their other ends to brackets attached to the upper part of the truck frame, a rocking bar loosely connected intermediate its ends to the center of said coupling means, and secured at one end to the center truck frame bar at one side, a link connection at the other end of said rocking bar, a bellcrank lever to one arm of which said link connection is pivotally connected fulcrumed to a bracket on the opposite side of the upper part of the truck frame, a draw rod pivotally attached at one end to the other arm of said bell-crank lever and at its other end to a lever pivoted at its upper end to the car bottom, and a draw rod pivotally secured to the lower end of said lever.

2. A braking device for the wheels of railroad car trucks, comprising a frame consisting of upper and lower side bars in which the axles carrying the wheels are journaled, a pair of cross-beams in approximately the middle of the frame one above the other, the upper one loosely held between the upper side bars of the frame, a plurality of strong spiral springs cushioning the beams, a brake shoe for each of the truck wheels, curved arms to the outer upper ends of which said brake shoes are pivotally connected, means for movably securing said arms intermediate their ends to the upper truck frame side bars, a means for connecting said curved arms, and a means adapted to be operated by the operation of the main brake lever of a train, and associated with said connecting means for simultaneously applying the brake shoes, and a means for releasing said brake shoes from the wheels.

3. In a braking device for the wheels of a railroad car truck comprising a pair of curved arms, shoes pivoted at the upper ends of each of said arms, links pivotally securing said arms near their upper ends to the truck frame, a cross-bar connecting said arms at the underside of the truck frame, two superposed median cross-beams on the truck frame, brackets secured to the front and rear face of the upper cross-beam, a rocking bar loosely connected intermediate its ends to said cross-bar, an upwardly curved end on said rocking bar pivotally attached to one of said brackets, a link connection at the other end of said rocking bar, a bell crank lever attached to the bracket opposite to the bracket to which said rocking-bar is secured and attached to the crossbeam of the truck frame on top thereof, one arm of said bell crank lever attached to said link connection, a draw rod secured at its inner end to said bell-crank lever at the other arm thereof, a lever pivotally depending from the car bottom at its upper end, a draw rod pivotally secured to said lever intermediate the ends thereof, and adapted to be operated from the main brake lever of a train, a rod pivotally secured to the lower end of said link for releasing the brake shoes after they have been applied by the operation of said draw rod.

Signed at Akron in the county of Summit and State of Ohio this 30th day of October, A. D. 1926.

WILLIAM NOWAK.